United States Patent [19]

Maczkó et al.

[11] 4,127,388
[45] Nov. 28, 1978

[54] APPARATUS FOR CONTACTING FUSED SOLID MATERIALS WITH SOLID, LIQUID OR GASEOUS MATERIALS

[75] Inventors: Gábor Maczkó; Dezsö Tóbiás; László Bozzay; Miklós Takács; Rudolf Kövesdi, all of Tiszavasvári, Hungary

[73] Assignee: Alkaloida Vegyészeti Gyár, Tiszavasvári, Hungary

[21] Appl. No.: 713,498

[22] Filed: Aug. 11, 1976

[30] Foreign Application Priority Data

Aug. 11, 1975 [HU] Hungary .............................. AA 820

[51] Int. Cl.² ........................................... B01D 11/02
[52] U.S. Cl. ..................................... 422/258; 34/135; 432/118; 23/313 R; 425/222; 422/270
[58] Field of Search ............. 23/269 R, 270.5, 293 A, 23/313; 423/658.5; 34/135; 432/118; 264/117; 425/222

[56] References Cited

U.S. PATENT DOCUMENTS

| 1,353,463 | 9/1920 | Dyer | 23/269 |
| 2,012,298 | 8/1935 | Berge | 23/269 |
| 3,851,087 | 11/1974 | Nowlin | 23/269 |

FOREIGN PATENT DOCUMENTS

| 261,210 | 6/1913 | Fed. Rep. of Germany | 23/269 |
| 324,583 | 8/1920 | Fed. Rep. of Germany | 23/269 |
| 328,448 | 10/1920 | Fed. Rep. of Germany | 23/269 |
| 357,693 | 8/1922 | Fed. Rep. of Germany | 23/269 |

Primary Examiner—Stephen J. Emery

[57] ABSTRACT

Apparatus for contacting fused solid materials with solid, liquid or gaseous materials, comprising a rotary drum, longitudinal baffles along the inner drum wall inside the apparatus, coaxial consoles being joined in a liquid- and gas-tight manner to faceplates of the drum, for lodging feeding and removing mechanisms. It is a major feature of the invention that a diverter baffle system is mounted from the consoles throughout the interior length of the drum. Two preferred embodiments are described: one for formulating plant protecting agents, wherein the baffle system includes a row of diverting baffles that can be pivoted inside the drum. The other preferred embodiment is suitable for extracting vegetable materials, and here the baffle system is constituted by a stationary drum having a slanting lapping formed therein, similarly pivotable diverting baffles being arranged along the lapping. Various additional and some optional structural features are disclosed for both apparatus embodiments.

5 Claims, 5 Drawing Figures

APPARATUS FOR CONTACTING FUSED SOLID MATERIALS WITH SOLID, LIQUID OR GASEOUS MATERIALS

The object of the invention is an apparatus for the contacting mainly of fused solid materials with solid, liquid or gaseos materials, suitably for the formulation of plant protecting agents and the extracting of vegetable materials.

According to the invention, wherein a rotary drum has longitudinal baffles on its interior surface, and the drum is supported and driven by rollers. A console is attached in a gas- and liquid-tight manner to each faceplate of the rotary drum, and feeding as well as removing provisions as well as regulating and servicing elements are arranged in the consoles.

The contacting of materials of identical or of dissimilar phases is among basic operations of the chemical industry. Such an operation, among others, is the mixing and extraction of fused solid materials and/or liquids, the formulation of plant protecting agents, the granulation and coating of various products, the treatment of seeds and conduct of chemical reactions.

In the formulation of plant protecting agents the liquid or solid active ingredient is applied to a solid, particulate material, the so-called carrier. The formulation is carried out mostly with rotating drum apparatus.

Apparatus suitable for the application of solid active ingredients has short, relatively large-diameter drums which are supported on rings attached to their outer surfaces, running over rollers and generally driven by a surrounding crown gear. Their means for charging and discharging is a simple port on the cylindrical surface or the faceplate, or a throat, chute, cell feeder or screw conveyor arranged in hollow consoles attached to the faceplate. Apparatus developed for the feeding of liquid active ingredients differ from the previously mentioned ones only in that atomizers are fixed to the interior of the rotating drum, and lengthwise baffles are arranged on the interior surface of the drum.

The most significant drawback of the known revolving-drum devices derives from their intermittent operation. In addition to the general drawbacks of intermittent operation such as the substantial downtime and the energy required for the frequent starting and stopping. It is also necessary to charge the entire amount of the carrier required for the nominal charge, and in the case of solid actives also the entire amount of the active ingredients.

This results in very large machinery when a performance is considered as usually required in industrial applications. The expenses required for capital investment maintenance and operation of such apparatus, are considerable.

The basic requirement of formulation cannot be satisfied with the known rotating-drum type devices to wit that identical or nearly identical amounts of the active have to be applied to each carrier particle, because the relative movement or mixing of the components in the rotary drum occurs in a random manner.

The quality of the formulating activity can be more or less improved only by increasing the time of treatment, but this will result after a while only in the an undersirable comminution of the carrier. In a similar sense the same considerations also apply to the mixing of two or more solid materials.

The known devices which are equipped with a charging-discharging port or throat cannot be built into a closed system, therefore, they cannot be used or can be used, only under special conditions, for the application of toxic active ingredients.

Experiments have been carried out to avoid the above drawbacks by contacting the components in a fluidized state. Such fluidized processes cannot be considered as complete solutions because even in the case of a large investment of energy only very low efficiency can be obtained, and the fluidized bed is very sensitive to the size and weight distribution of the particles; therefore, the constant maintenance of the fluidized condition can be established only by complicated regulations.

In a different operation which falls within the field of application this invention, especially in the extraction of of dry materials of a vegetable origin, the problem occurs that the specific gravity of the dry material to be extracted is smaller by an order of magnitude than the specific gravity of the solvent, therefore it would float to the top of the solvent if no special measures are employed. It was not possible to accomplish in the case of known extractors that the solvent should contact the entire amount of the dry material charge uniformly, thus much of the desired active component that is to be extracted is wasted with the extracted dry material. Another drawback which appears especially in the case of multi-stage apparatus is that in the first stages the extraction does not occur to the fullest extent. The pre-moistening, or the vacuum infiltration with hot water in the case of poppy pods, can be carried out only under intermittent operating conditions and, therefore, very large-size apparatus is required for the servicing of continuous extractors.

The objective of this invention is to provide a well adjustable, simple, and continuously operating apparatus.

In accordance with this invention this objective is accomplished by conducting at least one of the phases in a space closed off from the ambient atmosphere in a liquid-and gas-tight manner, along a screwcurve shaped path, and the dwell time is regulated by varying the thread or pitch distance of the screw curve-shaped path.

The essence of the present invention is that throughout the entire length of the interior of the rotary drum a baffle system is mounted from the consoles, which is comprised of a series of baffles, that can rotate along an axis which lies in a plane that is perpendicular to the longitudinal axis of the drum.

The invention is further described in detail with the aid of the drawing showing two suitable exemplary apparatus embodiments thereof, wherein FIG. 1 is a longitudinal section of a first exemplary embodiment of the inventive apparatus for contacting fused solid materials with solid, liquid or gaseous materials, particularly for the formulation of plant protecting agents;

Figure 1:
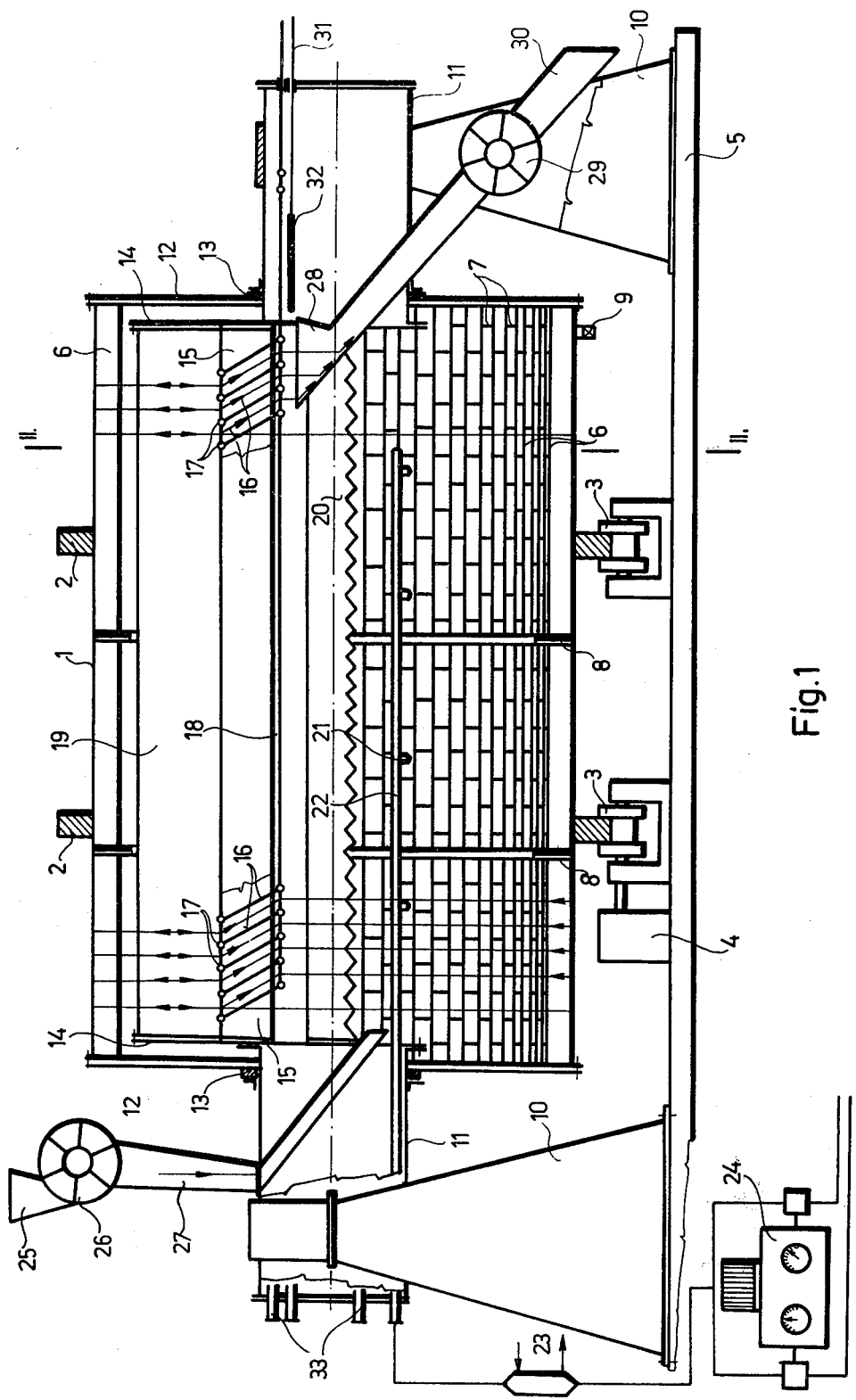
Figure 2:
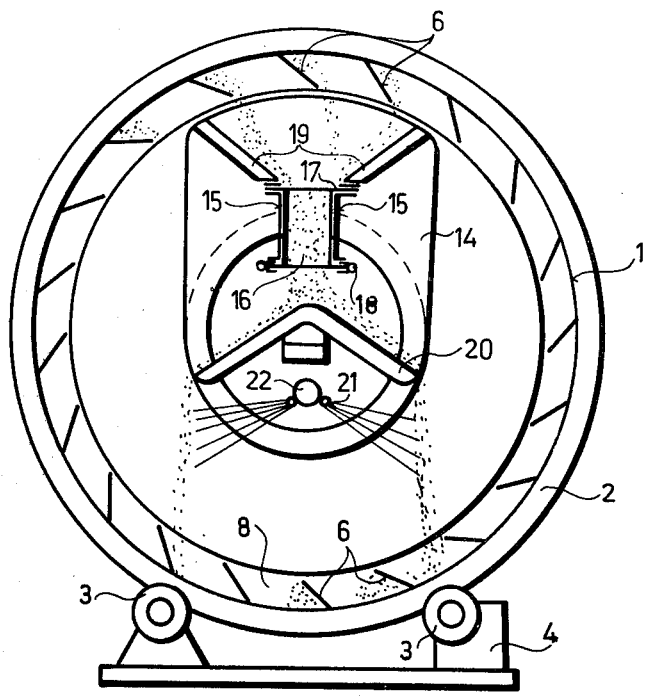
FIG. 2 is a section taken along line II—II of FIG. 1.

On FIGS. 1 and 2 we show and exemplary embodiment of the apparatus according to the invention, which is suitable for the formulation of plant protecting agents.

Rings 2 are affixed to an outer surface of a substantially horizontally positioned rotary drum 1 of the apparatus. The rings 2 are supported and rotated by two rollers 3 each. At least one of the rollers is driven by a suitably stepless drive 4. The rollers 3 and the drive 4 are mounted on a base frame 5 of the apparatus.

Longitudinal baffles 6 are mounted throughout the entire structural length of an interior mantle or wall of the rotary drum 1 in a given division. On the one hand, cross baffles 7 disposed beteween and being of equal height with the longitudinal baffles 6, and on the other hand, dividing ribs 8 are attached to the interior wall of the rotating drum 1, which are higher than the longitudinal baffles 6, to prevent or respectively regulate the axial movement of the components, particularly of the liquid components. A valve 9 is mounted from the inner drum wall for the removal of remainders.

A hollow cylinder-shaped console 11 each is arranged on footings 10 which are attached to the base frame 5, and these consoles are joined to faceplates 12 of the rotary drum 1. Self-adjusting, slipping ring packings 13 are arranged between the consoles 11 and the faceplates 12.

A holding plate 14 is attached to the end of each console 11, which is inside the rotating drum 1 and the baffle system of the apparatus is suspended from these plates. A row of further, longitudinal of baffles 16 is arranged between beams 15 which are tied to the plates 14. In the illustrated embodiment the baffles 16 are suspended, on the one hand, from axles 17 which are bedded in the beams 15 and are disposed in a plane which is perpendicular to the longitudinal axis of the rotary drum 1, and on the other hand, these baffles 16 are connected to a jointed adjusting rod system 18.

According to the invention the baffles 16 can also be subdivided into several groups which can be adjusted independently of each other by the aid of separate rod systems.

A trough 19 which is open at the bottom is disposed above the symmetrically arranged baffles 16, and under all of these there is a baffle plate 20. The edges of the baffle plate 20 are suitably formed with a sawtooth-like finish to increase the surface of the "curtain" formed from the dropping solid component The trough 19 and the baffle plate 20 are preferably double-walled for the heating or cooling of the components. A divider line supply pipe 22 which is provided with atomizers 21 is arranged under the baffle plate 20 for the introduction of the liquid active ingredient, as the case may be. On the one hand, a heat exchanger 23 and on the other hand, a feeding pump 24 is built in at the divider line 22. Suitably the feeding pump 24 is a multi-cylinder pump the stroke of which can be changed for the mixing of multicomponent active ingredients.

In another (not shown) embodiment of the present invention which is created for the burning out of solid materials, burners are mounted onto the fuel-fed divider line 22 instead of the atomizers 21.

According to FIG. 1 a feeding mechanism of the apparatus is is built into the left-hand console 11, which mechanism in the given case is composed of an input throat 25, a cell feeder 26 and a chute 27 to introduce a given weight of a fungible carrier in a time-controlled manner.

According to FIG. 1 a removing device of the apparatus is built into the right-hand console 11, which device is composed in this case of an outlet throat 28, a cell feeder 29 and a chute 30. The outlet throat 28 is arranged directly under the last baffles 16, taken in the direction of the path of travel of the components, and this throat is provided with a closure plate 32 which can be adjusted with a rod 31.

Further feeding, regulating and servicing elements can be built into the consoles 11, the a given case with the aid of pipe endings or attachments 33 arranged on the left side. Such elements could be, for example, for washing, neutralizing, evacuating, temperature measuring, etc. All of these elements are led through the mantles or end plates of the consoles 11 in a liquid-and gastight manner. The parts 34 to 42 of this embodiment will be described somewhat later in connection with FIG. 3.

Now we describe the operation of the apparatus shown in FIGS. 1 and 2. A solid carrier is fed with the assistance of the feeding mechanism at a given rate into the drum 1, rotated by of the drive 4. The longitudinal baffles 6 catch the material falling into the rotating drum 1 through the chute 27, and carry it upward until the material falls off these baffles 6 under the effect of gravity in the vicinity of the vertical symmetry axis of the apparatus. The falling-off material is led by the trough 19 onto the Further baffles 16, the angle of inclination of which determines the extent of this forwarding, and the angle can be adjusted by the rod system 18.

The baffle plate 20 then spreads the material falling through the baffles 16, in a curtain-like fashion, the particles which fall in a thin layer colliding suitably in a cross stream with the liquid active ingredient which is atomized through the spraying heads 21. Then the material falls between the longitudinal baffles 6 on the bottom of the rotating drum 1 and the process is repeated.

The direction of flow of the solid carrier is indicated in FIG. 1 by a line of arrows. The formulated plant protection material falls into the outlet throat 28, as it reaches the right-hand end of the rotating drum 1, as shown in FIG. 1, and then passes from the apparatus through the removing device.

The dwell time of the material in the apparatus can be regulated by the mutual relationship of the r.p.m. of the rotary drum 1 and the angle of inclination of the baffles 16. The carrier is led through the rotary drum 1 to its end along a screw thread-like path, as was described wherein the thread rise or pitch at any given time is adjusted by the angle of inclination of these baffles.

When the baffles 16 are subdivided into several independently adjustable groups, then the velocity of forward progression can be varied even within the rotary drum 1.

When the baffles 16 are adjusted to be vertical and the outlet throat 28 is closed off by the plate 32, than batchwise formulation or mixing can also be accomplished. In that case the efficiency can be increased by periodically oscillating of the baffles 16. After a predetermined amount of processing time the apparatus is emptied by adjusting the baffles 16 to the maximum forward push and opening the outlet throat 28.

The mutual ratio of the introduced carrier and the active ingredient is adjusted by the performance of the feeding pump 24 and of the cell feeder 26.

If both or all components are solid, then the preformulated mixture can be fed to the input throat 25 or one could build into the left-hand console 11 on FIG. 1 several, jointly adjustable feeding mechanisms.

With an experimental embodiment of the invention 30% active ingredient was applied to 70% carrier in a continuous process in a 1.5 m diameter × 3 m long rotary drum. 2 to 2.5 tons/hour faultless quality plant protection agent was obtained. We can mention for the sake of comparison that in a known apparatus of the same size productivity would not exceed 1 ton/hour.

Figure 3:
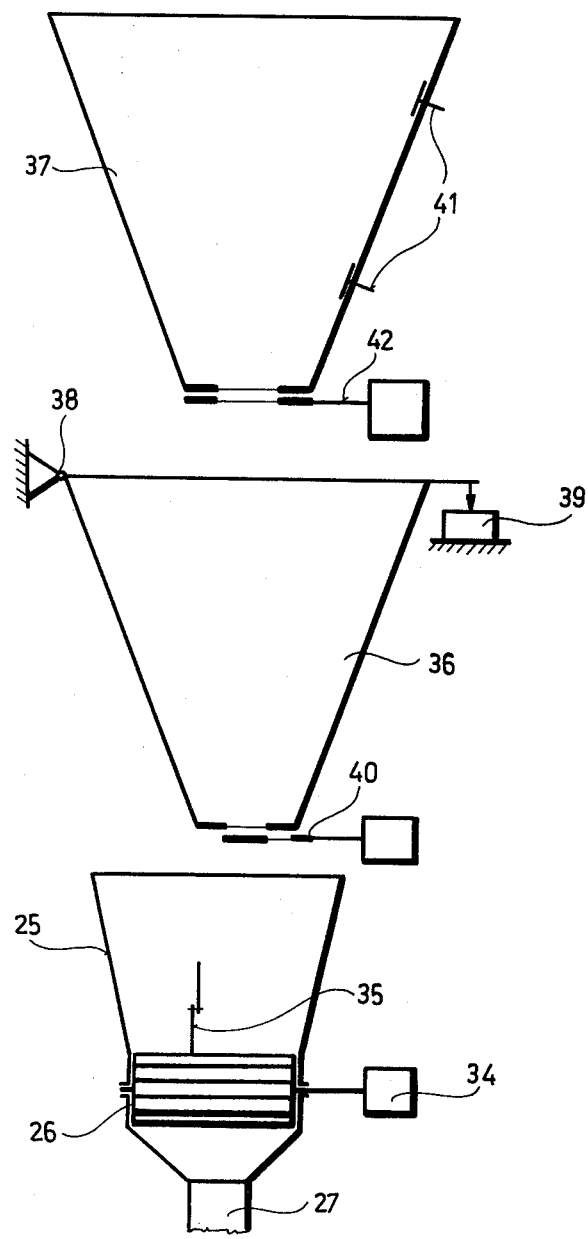
FIG. 3 is a schematic representation of an emobodiment of the feeder mechanism.

In FIG. 3 we show schematically an embodiment of the feeding mechanism which was developed for the uniform feeding into the apparatus of fungible solid materials of varying bulk density. An axially displaceable dividing plate 35 is built into the input throat 25 which is mounted onto the cell feeder 26, having a suitably stepless drive 34, and the dividing plate is perpendicular to the rotary axis of the cell feeder wheel. A balance 36 and a pre-storing throat 37 are arranged in that order above the input throat 25. The balance 36 is supported by a pivot 38 and a force-measuring cell 39, and is provided with a magnetically actuated closure plate 40 which has a time switch. The throat 37 is provided, on the one hand, with level sensors 41 and on the other hand, with a magnetically actuated closure plate 42.

The carrier is fed into the feeding mechanism shown in FIG. 3 and is maintained at a predetermined level with the sensors 41. When the upper level is exceeded then the feeder mechanism is stopped, and when the lower level is passed then the apparatus is shut down automatically, because it is a basic condition of the correct operation of the apparatus that the active ingredient must under all circumstances be applied to the carrier.

The closure plate 40 is opened periodically, as predetermined by means of the time switch, and it pours material into the balance which is set for the nominal weight performance so long as the force-measuring cell 39 emits a signal when the preset weight is reached, and thus closes the pre-storing throat 37. Simultaneously with this the closure plate 40 opens and the pre-measured weight of material reaches the input throat 25.

If the bulk density of the material is higher than its nominal value then the lower volume of material which corresponds to the given weight fills only that part of the input throat 25 which is determined by the dividing plate 35 on the right-hand side of FIG. 3. Consequently the cell feeder 26 delivers specifically less material, thus the material flows into the rotary drum 1 during the adjusted cycling time without interruption, and it cannot happen that the active ingredient exiting from the atomizers 21 would not collide with the carrier.

On the other hand, when the bulk density of the carrier is lower, then the material of given weight will completely fill the input throat 25 and the cell feeder 26 will work at full capacity and also forward the larger volume of material into the rotary drum 1 during the given time cycle.

Figure 5:
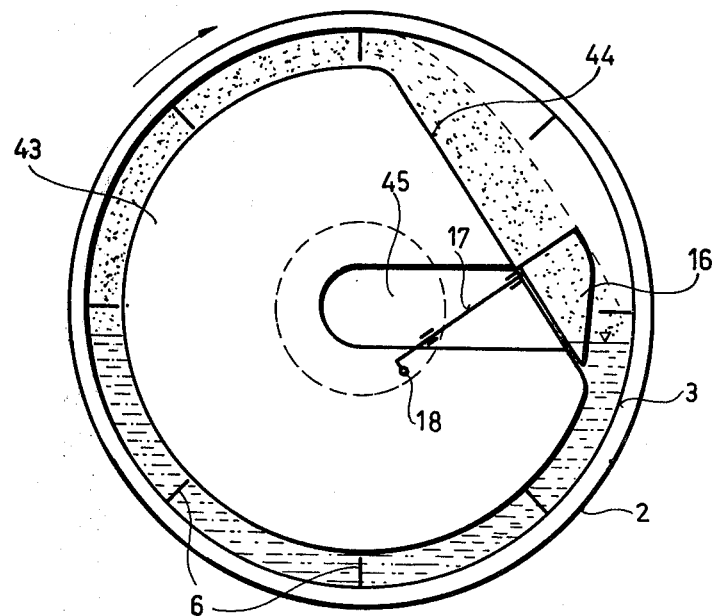
FIG. 5 is a section taken along the line V—V of FIG. 4.
Figure 4:
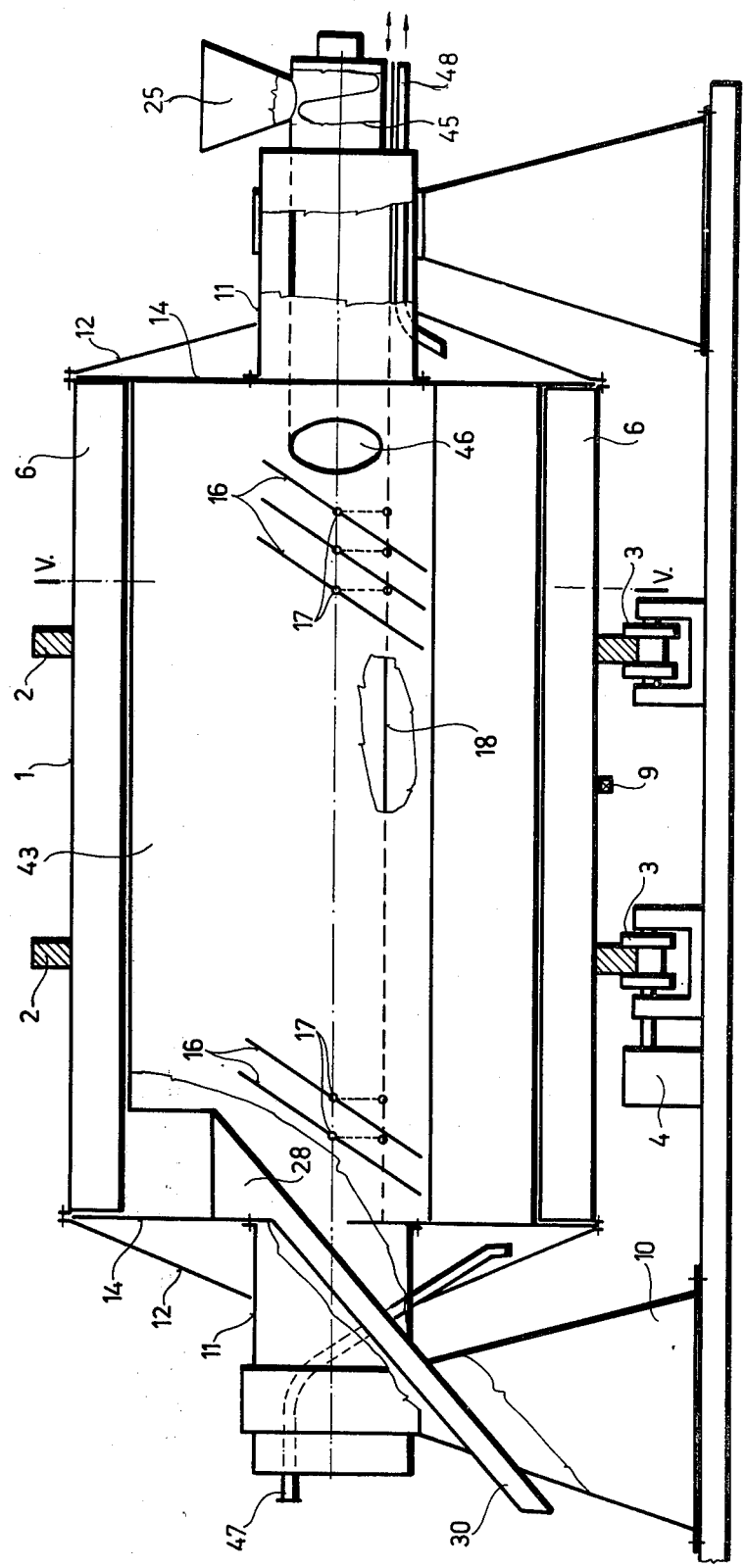
FIG. 4 is a longitudinal section of another embodiment, suitable for the extraction of vegetable materials.

Another embodiment of the apparatus of the invention is shown in FIGS. 4 and 5 which, is suitable for the extraction of vegetable materials. In the figures the identical components are identified with the same reference numerals which have been used heretofore and only the differing parts are additionally described.

In the case of this modification a stationary drum 43 is mounted from the holding plates 14, as a baffle system in the interior of the rotary drum 1. A slanting lapping 44 is formed on the interior mantle or wall of the stationary drum 43, suitably at the part following the top generatrix in the sense of rotation of the rotary drum 1. The row of baffles 16 are arranged on the lapping 44. The baffles 16 are connected with the arms wedged perpendicularly to their axles 17 with adjusting rods 18.

The feeding mechanism of the apparatus is suitably a screw conveyor 45 which is provided with a stepless drive, and which is led through one console 11 horizontally, in a diagonal direction, so that is throat opening 46 is on the lapping 44. A filling line 47 of the solvent is built into the left console 11 and a removal line 48 of the micelle is built into the right console 11.

The apparatus shown in FIGS. 4 and 5 operates as follows as an extractor or extractor premositening apparatus. The dry material that is to be extracted is fed into the rotary drum 1 with the screw conveyor 45 at a predetermined rate. In the rotary drum 1, which is filled with the solvent to the desired level, and the lengthwise baffles 16 force the dry material under the solvent along the interior wall of the stationary drum 43. The material which slides down on the lapping 44 progresses in an axial direction as a function of the angle of tilt of the baffles 16. The outlet throat 28 is arranged at the left-hand end of the stationary drum 43 along the lapping 44, and the extracted or premoistened material is led out through the outlet throat 28.

The solvent fed through the filling line 47 is conducted through the apparatus essentially in a cross stream, and the micelle is removed from the rotary drum 1 through the removal line 48.

Poppy pods were extracted with the apparatus of the invention. The required amount of solvent as related to the weight of the pods was 4 to 500%, instead of the 200% value in the case of known extractors, while the increase of the concentration of the solvent was identical to that which could be reached in a single extraction step.

In the inventive apparatus one can work with a good efficiency by using as solvent the micelle of a given known extractor, and its already extracted output as the material to be extracted.

The above good results are attributable to the fact that, in contrast to the known extractors, on the one hand a constant turbulent flow is formed on the surface of the dry material to be extracted (extrahand), instead of a laminar flow, and on the other hand, the hydrostatic pressure of the solvent markedly promotes capillary phenomena.

The advantages of the inventive apparatus embodiments can be summarized as follows:

the technological procedure can be kept well in hand, and intervention for its regulation is possible at several places;

even at high production rates the apparatus can be constructed with small overall dimensions, and its specific consumption of energy is very favorable; and finally within the scope of the invention the apparatus can be made suitable with simple modifications for a variety of procedures, such as mixing, homogenizing, cooling or heating, drying, calcining, firing, coating, granulating, bleaching, and for various other chemical reactions.

We claim:

1. An apparatus for contacting fused solid materials with solid, liquid or gaseous materials, including active ingredients, having different specific weights, and for extracting vegetable materials, comprising, in combination: an outer rotary drum having a longitudinal axis, an interior wall and longitudinal baffles along beams that extend axially within said wall; said drum being supported for rotation; coaxially fixed consoles joined in a liquid- and gas-tight manner to respective faceplates of said drum; said consoles lodging a feeding mechanism and a removing device; a diverter baffle system mounted from said consoles throughout the interior of said rotary drum, constituted by an inner stationary drum also having an interior wall; a slanting lapping being formed in a section of said stationary drum, resting on said consoles, following the topmost generatrix of said interior wall of the stationary drum; pivotable diverting baffles arranged along said lapping; an open-bottom trough disposed above said diverting baffles for collecting the processed materials in an intermediate stage of the contacting process; an inverted V-shaped baffle plate dividing the stream of the materials descending from said trough between and through said diverting baffles; a removal line forming part of said removing device; said diverting baffles being mounted on said stationary drum, in which the diameter of a cylindrical portion is nearly identical with that of a rotational envelope constituted by outer edges of said longitudinal baffles, an upper edge of said lapping being near said topmost generatrix, while its lower edge is above a liquid level, determined by the location of said removal line, at a distance equal to at least that between two adjoining ones of said longitudinal baffles; means for producing a horizontally and vertically continuous curtain-like material advancement of a substantially uniform thickness, along the entire inner drum length, to allow the active ingredients to be atomized onto the curtain-like material, constituted by parts of said longitudinal baffles that successively apply the materials, said trough in which the materials are collected in the intermediate stage, said diverting baffles that allow a uniform material stream to be produced, and of said baffle plate where the material stream is divided; means for forcing the materials to follow a path conducive to intimate contacting and intermixing regardless of their different specific weights, during the continuous curtain-like advancement, and for forcing them below said liquid level with each revolution of said rotary drum, the materials being prevented from exiting from between said longitudinal baffles, constituted by parts of the latter closely contacting said stationary drum, said lower edge of said lapping above the liquid level leading the materials to reach the spaces between said longitudinal baffles, to force them to drop below said liquid level; and means for guiding the moistened materials to slide down on said lapping, on account of gravity, and on axial pushing by said longitudinal baffles, constituted by the arrangement of said upper edge of the lapping near said topmost generatrix where said longitudinal baffles are given a vertical position.

2. The apparatus as defined in claim 1, wherein at least one of said feeding mechanism and said removing device is in the form of a screw conveyor.

3. The apparatus as defined in claim 2, wherein said feeding mechanism includes an input throat, and further comprising a balance and a prestoring throat arranged above said throat.

4. The apparatus as defined in claim 3, further comprising a dividing plate built substantially perpendicularly to the axis of rotation of said screw conveyor and movable parallel to itself.

5. The apparatus as defined in claim 1, further comprising rollers for driving said rotary drum, and attachments for extraneous regulating and servicing elements.

* * * * *